(12) United States Patent
Millet et al.

(10) Patent No.: US 7,460,537 B2
(45) Date of Patent: Dec. 2, 2008

(54) SUPPLEMENTARY HEADER FOR MULTIFABRIC AND HIGH PORT COUNT SWITCH SUPPORT IN A FIBRE CHANNEL NETWORK

(75) Inventors: Timothy John Millet, Mountainview, CA (US); Surya Prakash Varanasi, San Ramon, CA (US); Zahid Hussain, San Jose, CA (US); Kung-Ling Ko, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 873 days.

(21) Appl. No.: 10/767,410

(22) Filed: Jan. 29, 2004

(65) Prior Publication Data

US 2005/0169311 A1 Aug. 4, 2005

(51) Int. Cl.
 *H04J 14/08* (2006.01)
(52) U.S. Cl. ...................... 370/392; 370/474
(58) Field of Classification Search .............. 370/392, 370/474, 476
See application file for complete search history.

(56) References Cited

U.S. PATENT DOCUMENTS

| | | | | |
|---|---|---|---|---|
| 2003/0118053 A1* | 6/2003 | Edsall et al. | ............... | 370/474 |
| 2004/0151174 A1* | 8/2004 | Del Signore et al. | ........ | 370/389 |
| 2005/0169188 A1* | 8/2005 | Cometto et al. | ............. | 370/249 |
| 2005/0169258 A1* | 8/2005 | Millet et al. | ................ | 370/389 |
| 2006/0023708 A1* | 2/2006 | Snively et al. | .............. | 370/389 |
| 2006/0023751 A1* | 2/2006 | Wilson et al. | ............... | 370/474 |
| 2006/0029071 A1 | 2/2006 | Perera et al. | ................ | 370/389 |
| 2006/0034302 A1 | 2/2006 | Peterson | ..................... | 370/401 |

OTHER PUBLICATIONS

American National Standard of Accredited Standards Committee (NCITS), "Fibre Channel Fabric Generic Requirements (FC-FG)," Aug. 7, 1996, pp. i-23, Published by American National Standards Institute, New York, New York.

American National Standard of Accredited Standards Committee (NCITS), "Fibre Channel Switch Fabric-3 (FC-SW-3)," Jan. 24, 2002, pp. i-190, Published by American National Standards Institute, New York, New York.

(Continued)

*Primary Examiner*—Melvin Marcelo
(74) *Attorney, Agent, or Firm*—Conley Rose, P.C.

(57) ABSTRACT

Accordingly, there is disclosed herein an augmented Fibre Channel (FC) frame format which may provide support for multiple fabric FC networks, and may improve the performance of modularly-constructed switches. In one embodiment, the augmented FC frame format is modulated on a carrier signal and the frame includes: a start-of-frame field; a supplementary header field that follows the start-of-frame field; a frame header field that follows the supplementary header field; a cyclic redundancy code (CRC) checksum field; and an end-of-frame field that follows the CRC checksum field. The supplementary header field may include a destination tag that identifies a target fabric to which the frame is directed. Alternatively, or in addition, the supplementary header field may include an egress port identifier that identifies a switch port through which the frame is to exit a switch. The supplementary header may also include flags to request special handling by the receiver.

27 Claims, 3 Drawing Sheets

OTHER PUBLICATIONS

American National Standard of Accredited Standards Committee (NCITS), "Fibre Channel Framing And Signaling (FC-FS)," Feb. 8, 2002, pp. i-575, Published by American National Standards Institute, New York, New York.

American National Standard of Accredited Standards Committee (NCITS), "Fibre Channel Backbone (FC-BB-2)," Mar. 6, 2002, pp. i-118, Published by American Standards Institute, New York, New York.

* cited by examiner

SUPPLEMENTARY HEADER FOR MULTIFABRIC AND HIGH PORT COUNT SWITCH SUPPORT IN A FIBRE CHANNEL NETWORK

CROSS-REFERENCE TO RELATED APPLICATIONS

Not Applicable.

BACKGROUND

Computer networks facilitate communication between computers, and between computers and stand-alone peripherals. Computer networks enable large scale computing systems, distributed service systems, and a whole host of applications that would otherwise be infeasible. Thus, incentives exist for the use and enhancement of computer network technology. As computer networks increase in speed and size, they require more sophisticated protocols to ensure fast and reliable communications.

Storage area networks (SANs) are a popular type of computer network. SANs are networks of data storage devices (e.g. RAID units). The SAN is usually a sub-network of a larger computer network that includes servers and personal computers. SANs provide a large, shared storage capacity that has a high bandwidth access and does not have to be accessed through another device.

Many SANs rely on the Fibre Channel (FC) protocol. A single FC link can carry data at rates up to 4 gigabits per second (Gb/s) in both directions simultaneously. The FC protocol defines standard media and signaling conventions for transporting data in a serial fashion. It also provides an error correcting channel code and a frame structure for transporting the data. Further, the FC protocol sets out a buffer-credit-based flow control methodology, and creates some common services (e.g. fabric controller, name server). The FC protocol can be applied to various network topologies including point-to-point, ring, and switched fabric. Further details regarding the FC protocol can be found online at www.fibrechannel.org.

FC SANs can be implemented with a number of topologies. The most popular topology is a switched fabric topology, i.e., a fabric made up of switches that interconnect end-node devices. The FC standard defines a fabric as "the entity which interconnects various [end nodes] attached to it and is capable of routing frames by using only the [destination identifier] information in [the] frame header". As SANs have grown in size, it has been observed that smaller fabrics are generally more reliable and easier to maintain than larger fabrics. It has also been observed that customers seem to prefer fabrics with a small number of large switches over fabrics with a large number of small switches. Accordingly, a trend is expected in SAN technology towards multiple-fabric solutions in which each fabric includes only a small number of large switches.

The FC protocol lacks support for inter-fabric communication. It would be desirable to augment the FC protocol to provide support for inter-network communication. It would further be desirable to make implementation of high-performance, high port count switches more economical.

SUMMARY

Accordingly, there is disclosed herein an augmented Fibre Channel (FC) frame format which may provide support for multiple fabric FC networks, and may improve the performance of modularly-constructed switches. In one embodiment, the augmented FC frame format is modulated on a carrier signal and the frame includes: a start-of-frame field; a supplementary header field that follows the start-of-frame field; a frame header field that follows the supplementary header field; a cyclic redundancy code (CRC) checksum field; and an end-of-frame field that follows the CRC checksum field. The supplementary header field may include a destination tag that identifies a target fabric to which the frame is directed. Alternatively, or in addition, the supplementary header field may include an egress port identifier that identifies a switch port through which the frame is to exit a switch. The supplementary header may also include flags to request special handling by the receiver.

BRIEF DESCRIPTION OF THE DRAWINGS

A better understanding of the present invention can be obtained when the following detailed description of various illustrative embodiments is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Although the Fibre Channel (FC) protocol lacks support for inter-fabric communications, a number of approaches may be conceived for providing inter-fabric communications support within the confines of the FC protocol. One such approach would employ aliases for source and destination identifiers. Switches at boundaries between fabrics might be configured to recognize such aliases and translate the source and destination identifiers, thereby allowing a FC frame to pass from fabric to fabric.

Figure 1:
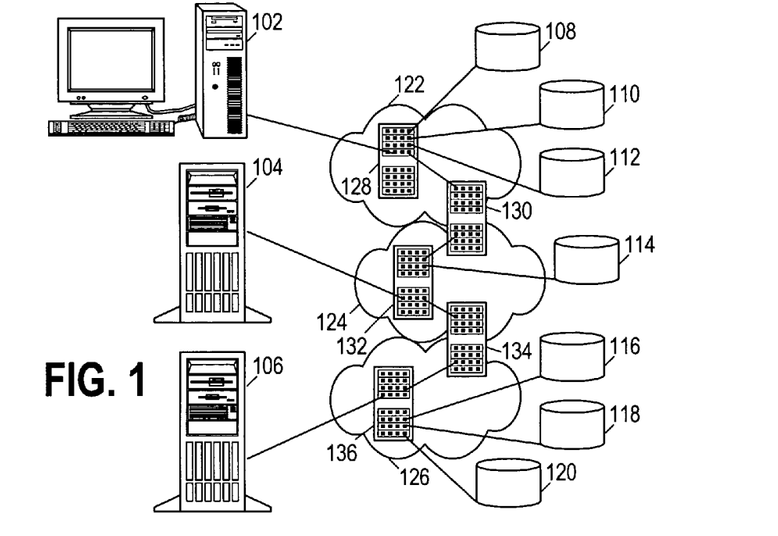
FIG. 1 shows an illustrative multi-fabric FC network.

FIG. 1 shows an illustrative multi-fabric Fibre Channel (FC) network in which computer 102 and servers 104-106 are coupled to an array of stand-alone disk drives 108-120 by three FC fabrics 122, 124 and 126. Fabric 122 includes switch 128 and some of the ports from switch 130. Switch 130 acts as a bridge between fabrics 122 and 124. Fabric 124 includes some of the ports from switch 130, all of switch 132, and some of the ports from switch 134. Switch 134 acts as a bridge between fabrics 124 and 126. Finally, fabric 136 includes some of the ports from switch 134, and all of switch 136.

Computer 102 and disk drives 108-112 are attached to fabric 122. Server 104 and disk drive 114 are attached to fabric 124. Server 106 and disk drives 116-120 are attached to fabric 126. In one approach to providing inter-fabric communications, the bridging switches 130 and 134 may be configured to perform translation functions, e.g., mapping source and destination identifiers to corresponding values in the new fabric. Note, however, that communications from fabric 122 to fabric 126 would have to be translated twice; once at the boundary between fabrics 122 and 124, and again at the boundary between fabrics 124 and 126. It is expected that each translation operation would significantly increase latency, so it would be desirable to minimize the number of inter-fabric communications.

Accordingly, in an improved approach to providing inter-fabric communications, the inter-switch links may be configured to transport untranslated FC frames. Thus, for example, if the inter-switch links between switches 130, 132, and 134 are configured to transport untranslated FC frames, a frame sent from fabric 122 to fabric 126 may be translated only as it reaches its destination fabric. Alternatively, the frame could be translated only as it leaves the source fabric. In either case, only a single translation operation would be needed. As explained further below, the transport of untranslated FC frames may be accomplished through the use of a supplementary frame header.

Figure 2:
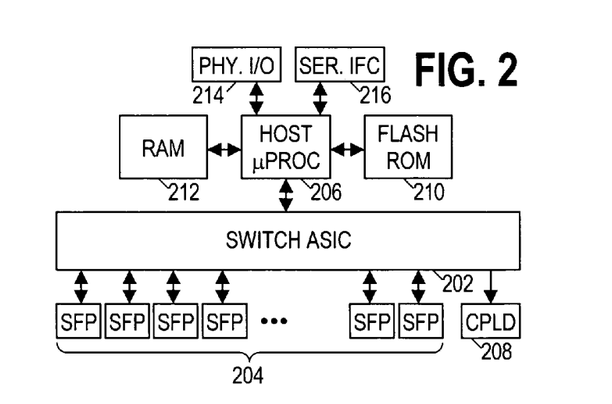
FIG. 2 shows a block diagram of an illustrative small port count switch.

FIG. 2 shows a block diagram of an illustrative low port count FC switch. The heart of the switch is an application-specific integrated circuit (ASIC) 202. ASIC 202 includes a number of FC ports coupled to small form-factor pluggable (SFP) sockets 204, a host processor port coupled to a host processor 206, and an indicator interface coupled to a complex programmable logic device (CPLD) 208. Host processor 206 is coupled to a flash read-only memory (ROM) 210, a random access memory (RAM) 212, a physical I/O interface 214, and a serial interface 216.

The sockets 204 accept connectors for links to end nodes or other switches. Generally, the switch ASIC 202 receives frames from the links, determines the appropriate outgoing port, and sends the frames onward. When the switch ASIC 202 cannot determine the appropriate outgoing port, or when the frame is a fabric services frame, the switch ASIC routes the frame to the host processor 206 via the processor port.

The host processor 206 performs a number of functions, including the initialization and configuration of the switch. A flash ROM 210 provides nonvolatile storage of firmware and configuration parameters. When the switch is powered up, host processor 206 executes the firmware from flash ROM 210. The firmware configures the host processor 206 to initialize and configure the switch ASIC 202, and may further configure the host processor to build a master set of routing tables in memory 212. As the switch begins routing frames, the host processor may provide the switch ASIC 202 with frequently-used entries from the master routing tables. The switch ASIC 202 includes smaller routing tables in which these entries may be stored and quickly accessed.

The firmware also configures the host processor 206 to detect user actions via interface 214, and to respond or provide other status information via this interface. Interface 214 may couple to buttons, switches, status lights, or other common user input and output devices built into the switch. Examples may include a power button, a reset button, DIP switches for setting a parameter, a power light, and a fault light. The firmware may further configure the host processor 206 to interface with an external computer via serial interface 216. For example, the host processor may receive firmware upgrades or various programmable parameter settings from an external computer, and may provide statistics, status, and error information to the external computer via this port.

A common feature for many switches is the use of "port lights", or status LEDs, associated with each port. The port lights may be configured to indicate, for each port, when a valid link has been established, frames are being transmitted, when frames are being received, and a link speed. The port lights may be driven by CPLD 208 in accordance with a signal received from the switch ASIC 202.

The various ports of switch ASIC 202 may be individually configured in one of multiple modes. For example, a port linked to an end node may be configured as an F-Port that (as specified by the FC standard) serves as a end node's interface with a fabric. As another example, a port linked to another FC-compliant switch may be configured as an E-Port that (as specified by the FC standard) supports inter-switch communications within a fabric. As yet another example, a port linked to a switch that supports inter-fabric communications may be configured as an I-Port (a port configured to exchange augmented frames with another I-Port and intended for inter-fabric communications). As still yet another example, a port linking two switch ASICs together within a given switch may be configured as a C-Port (a port configured to exchange augmented frames with another C-Port and intended for intra-switch communications). C-Ports are so named because they may have the greatest utility in the context of connections to the core in a core-edge topology.

The I-Port and the C-Port are new concepts, and as such, they are not disclosed in the current FC standard. One factor that distinguishes I-Ports and C-Ports from an E-Port or a F-Port is the supplementary header that is embedded in frames transported via I-Ports and C-Ports. The switch ASIC 202 may add supplementary headers to frames received via E-Ports and F-Ports, and may remove supplementary headers from frames transmitted via E-Ports and F-Ports. Thus, the switch ASIC 202 ensures compatibility with the FC standard while enabling support for multiple fabrics and high port count switches when the switch ASIC 202 is in coupled to other ports that provide such support.

Figure 3:
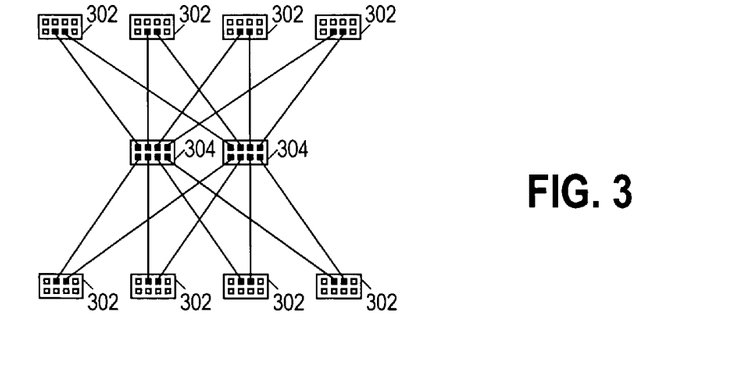
FIG. 3 shows a core-edge topology for constructing an illustrative high port count switch.

FIG. 2 showed an illustrative low port count switch, in which only a single switch ASIC 202 was employed. One economical way to construct a high port count switch is to use multiple switch ASICs in an appropriate configuration. FIG. 3 shows an example of a core-edge topology, which is one topology that may be used to form a high port count switch out of multiple, smaller port count switch ASICs.

In the example of FIG. 3, a combination of ten 8-port switch ASICs is used to produce a 48-port switch. Eight "edge" ASICs 302 are coupled to two "core" ASICs 304. In an alternative embodiment, ten 32-port switch ASICs may be combined in a similar fashion to obtain a 128-port switch. The only distinction between core and edge ASICs is their position in the topology. The edge ASICs have open ports which would be configured with sockets for external connections. The rest of the ports (on both the edge and core ASICS) are configured for intra-switch connections, and may be programmed to operate as C-Ports.

One or more host processors may be included in the switch of FIG. 3 to carry out similar operations as the processor of FIG. 2. The host processor(s) can coordinate the routing tables of multiple switch ASICs. However, much like the translation operation on inter-fabric frames, maintaining all the routing tables can contribute to communications latency. The number of routing tables that need to be (actively) maintained may be reduced by providing each external port of the switch with a unique port identifier (unique within the switch), and routing frames through the core ASICs using the port identifier for the port through which a frame will exit the switch.

Accordingly, in certain switch embodiments employing the core-edge topology, every frame traversing the switch is provided with a supplementary frame header that includes an egress field to specify the port identifier of the external port through which the frame will exit the switch. The egress field is populated by the ASIC that first receives the frame from an external source. The host processor(s) only need to maintain the routing tables of the edge ASICs, and even for these tables, only the routing information for incoming traffic is needed.

The supplementary frame header may also include other fields to carry information from one switch to another or from one switch ASIC to another. One of these fields may carry an indication of the virtual channel that is (or that is to be) associated with the frame. Virtual channels are a commonly-used technique for creating multiple lines of communication ("channels") across a single link. The use of multiple channels may allow for several advantages including prioritization (allowing high priority frames to bypass queues of low priority frames), bandwidth allocation (guaranteeing that a channel has at least some minimum fraction of the link bandwidth), and efficient link usage (allowing the link to continue transporting frames even if a particular channel is blocked). In some switch embodiments, the internal virtual channel configuration may be predetermined, and may not reflect the virtual channel configuration on the external links to the switch. Various contemplated embodiments of such switches place the external virtual channel information in the supplementary frame header as the frame enters the switch, and may associate that frame with the specified external virtual channel as the frame leaves the switch.

Figure 4:
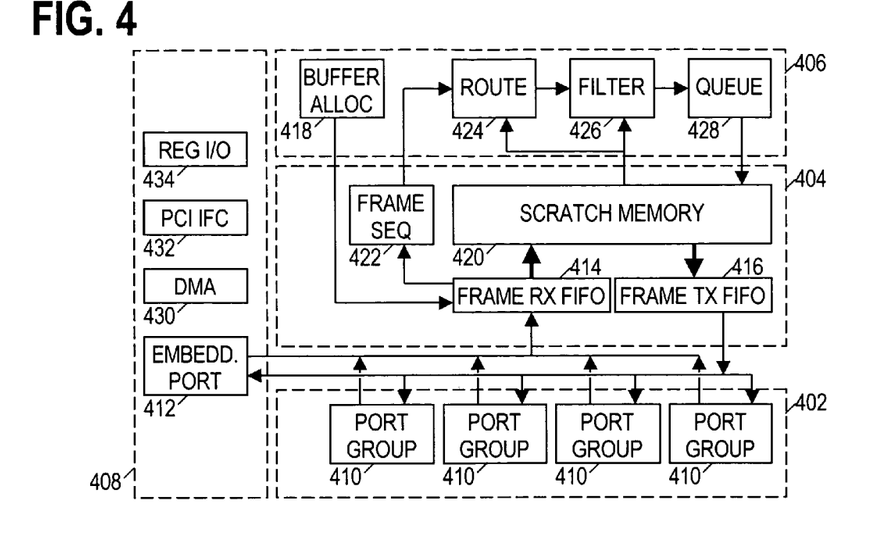
FIG. 4 shows a block diagram of an illustrative ASIC for constructing a FC switch.

FIG. 4 shows a block diagram of an illustrative switch ASIC. The illustrative ASIC includes four modules: a port module 402, a data storage module 404, a control module 406, and a system interface module 408. The port module 402 may include multiple port logic blocks 410, each of which may provide interface logic for multiple FC ports. In one embodiment, four port logic blocks 410 are provided, each including interface logic for eight FC ports, and further including a buffer credit manager for controlling data flow across the FC links, as well as a statistics gathering block. (Thus, 32 FC port interface logic instances are provided.) The interface logic for each FC port may detect start-of-frame (SOF) and end-of-frame (EOF) delimiters, and may perform cyclic redundancy code (CRC) checksum verification to ensure that the frames have not been corrupted. If errors are detected, the interface logic may discard or invalidate the frames and report the error to the statistics gathering block.

The data storage module 404 may include a receive buffer block 414, a transmit buffer block 416, a scratch memory block 420, and a frame sequencing block 422. The receive buffer block 414 may include a first-in first-out (FIFO) buffer for each FC port, and may include an additional FIFO buffer for the embedded port 412 (described below in the context of system interface module 408). Each of the FIFO buffers in the receive buffer block 414 is coupled to a corresponding port to store frame words as they are received. The transmit buffer block 414 may similarly include a FIFO buffer for each FC port and the embedded port 412. Each of the FIFO buffers in the transmit block is coupled to a corresponding port to store frame words for transmission. The transmit and receive FIFOs may simply provide buffering between the scratch memory and the port interface logic.

Scratch memory 420 serves as a temporary holding area for frame data as the routing and filtering operations are performed by control module 406. A buffer allocation block 418 in the control module notifies the receive buffer block 414 of available buffers in scratch memory 420. Frame data is transferred from FIFO buffers in the receive buffer block 414 to the available buffers in memory 420. As frame headers are stored, the frame sequencing block 422 determines a processing order for the received frames. As the control module 406 completes processing (as described below), the scratch memory 428 transfers frame data to the transmit buffer block 416. In one embodiment, the processing may be performed at "wire speed", i.e., sufficiently fast to allow an outgoing FC port to begin transmitting a given frame before the receiving port has completed receiving that frame.

The control module 406 may include the buffer allocation block 418, a routing block 424, a filter block 426, and a queue block 428. In one embodiment, the buffer allocation block 418 issues available buffer notifications at a fixed rate which is determined in accordance with a maximum frame rate. The routing block 424 performs a table lookup based on one of: 1) the egress port identifier (for intra-switch routing), 2) the source tag/destination tag pair (for inter-fabric routing), and 3) the source identifier/destination identifier pair (for intra-fabric routing). The routing method employed is determined by the configuration of the port through which the frame is received.

Returning momentarily to the FC port logic in blocks 410, each FC port may include a programmable register that specifies the configuration of the port. Ports that are configured as an F-Port or as an E-Port may add an (empty) supplementary header to each received frame, and may drop the supplementary header from each frame that is transmitted. Ports that are configured as an I-Port or as a C-Port may receive and transmit frames with supplementary headers. Thus, all the frames passing through the data storage module 404 and operated on by the control module 406 possess a supplementary header (although this header may be empty for frames received via an F-Port or an E-Port).

Routing block 424 may determine routing information using table look-ups. The host processor may determine the routing information and place the routing information in the appropriate routing tables. Routing block 424 may perform the table look-up in the following fashion. First, the routing block 424 determines whether the frame was received via a C-Port, and if so, the routing block performs a table look-up based on the egress port identifier. The look-up identifies the outgoing port from the switch ASIC, and no modification is made to the supplementary header.

If the frame was instead received via an I-Port, the routing block 424 determines whether the present switch is the "target" switch, i.e., whether the destination tag matches a fabric to which the switch belongs. If the present switch is not the target switch, the routing block 424 performs a table look-up based on the source tag and destination tag to obtain routing information. The routing information may include (inter alia) the outgoing port from the switch ASIC, the egress port identifier of the switch, a virtual channel assignment, and a priority. Some of this information may be placed in the supplementary header. If the present switch is the target switch, routing block 424 may route the frame to the embedded port for a translation operation. After any necessary translation of the source and destination identifiers has been performed, the frame may be treated as an intra-fabric frame, and routed based on the source and destination identifiers.

If the frame was received via an F-Port or an E-Port, the routing block 424 performs a table look-up based on the source and destination identifiers to obtain routing information. As before, the routing information may include (inter alia) the outgoing port from the switch ASIC, the egress port identifier of the switch, a virtual channel assignment, and a priority. The routing information may further include a source tag and a destination tag. Some of this information may be placed in the supplementary header.

The routing block 424 passes the routing information to the filter block 426. Filter block 426 may additionally retrieve other header information from the scratch memory 420. The filter block 426 may compare the routing information and/or other header information to programmed values and may take action upon detecting a match. The action may include discarding a frame, incrementing a counter, and/or routing the frame to the embedded port for more complex operations. Routing information of frames that have not been discarded is provided to queue 428. Queue 428 determines whether enough of a frame has been received to begin retransmission, and if so, the queue 428 places the frame in line for transmission via the appropriate outgoing port. As opportunities become available for the transfer of frames to the transmit buffer block 416, the frames are de-queued from queue 428 and scratch memory 420 begins transferring the frame data.

The system interface module 408 may include an embedded port 412, a direct memory access (DMA) module 430, a peripheral component interconnect (PCI) interface 432, and a register block 434. The embedded port 412 serves as an interface through which frames can be communicated to and from a host processor. The DMA module 430 automates the transfer of frame data through the PCI interface 432 to and from a host processor memory area. The host processor can also access the register block 434 via the PCI interface 432. The register block provides a memory-mapped set of registers that allow the host processor to configure and monitor the operation of the switch ASIC.

Figure 5:
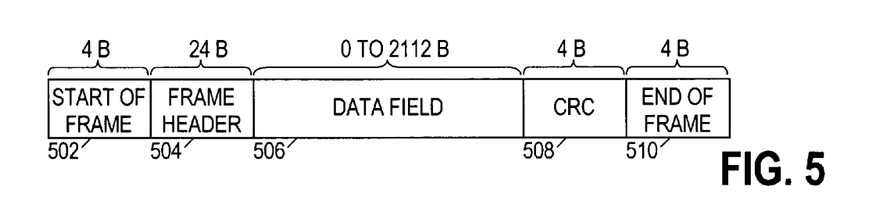
FIG. 5 shows a FC frame in accordance with the FC standard.

FIG. 5 shows a frame format that complies with the FC standard. FC frames begin with a start-of-frame (SOF) field 502 that is four bytes long. The SOF field 502 is followed by a frame header field 504 that is 24 bytes long. The frame header field 504 is followed in turn by a data field 506, which can range from 0 to 2112 bytes in length in four byte increments. The data field 506 may be subdivided into an optional header region, a payload region, and a fill region. The optional headers may provide frame-specific data, the payload region carries the actual data being transported, and the fill region simply ensures that the data field 506 ends on a four-byte boundary. The data field 506 is followed by a CRC field 508 that is four bytes long. The frame is terminated by an end-of-frame (EOF) field 510 that is four bytes long.

Figure 6:
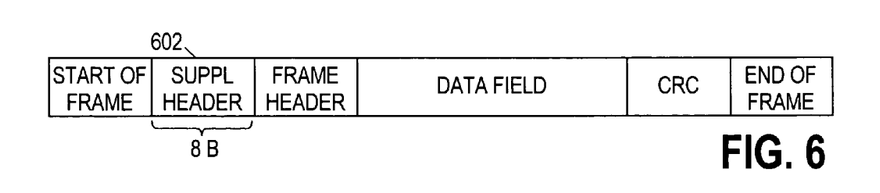
FIG. 6 shows an augmented FC frame in accordance with certain embodiments of the present invention.

FIG. 6 shows an illustrative augmented frame format that may be employed by C-Ports and I-Ports. The augmented frame format is based on the FC frame format and deviates only in that a supplementary header is inserted immediately after the SOF field 502 and immediately before the frame header 504. In one embodiment, the supplementary header is 8 bytes long, and is divided as shown in FIG. 7 (described further below).

The supplementary header 602 allows switch ASICs (and other switches) to cooperate in making routing decisions. A first switch ASIC can embed additional information to be carried along with the frame to other switch ASICs or switches, allowing the other ASICs or switches to avoid performing duplicative operations. Thus, for example, a single switch ASIC can determine the appropriate egress port from a switch, and the other switch ASICs can simply forward the frame in accordance with a fixed and predetermined topology. Or as another example, the translation operations associated with inter-fabric transport of frames can be deferred if a first switch determines a destination fabric, allowing intervening switches to ignore the untranslated (or potentially even the translated) source and destination identifier fields in the FC frame header. As yet another example, a priority classification may be made by a first switch or switch ASIC, and can be easily communicated to downstream switches and/or switch ASICs which can then expedite frames as appropriate without first having to redetermine the frame priority.

Figure 7:
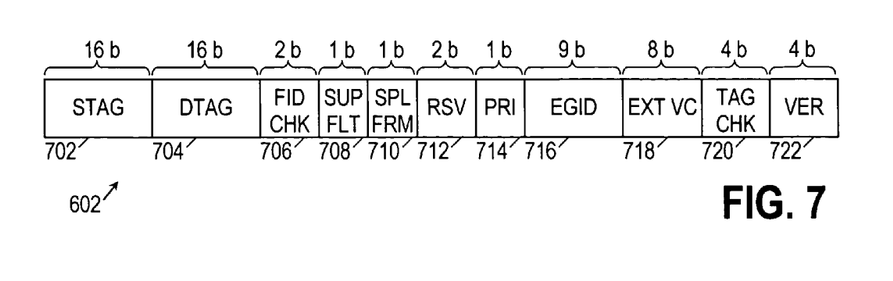
FIG. 7 shows an illustrative supplementary header in accordance with certain embodiments of the present invention.

As shown in FIG. 7, an illustrative supplementary header 602 includes a source tag (STAG) field 702, a destination tag (DTAG) field 704, a frame buffer identifier (FID) checksum field 706, a suppress filter flag 708, a special frame flag 710, a reserved field 712, a priority flag 714, an egress port identifier (EGID) field 716, an external virtual channel (VC) field 718, a tag checksum field 720, and a version field 722. The source tag identifies the fabric from which the frame originates. The destination tag identifies the fabric to which the frame is directed.

The FID checksum 706 may be used to validate the integrity of data frames as they leave the switch. (In some switch embodiments, the header(s) may become isolated from the frame payload. In such embodiments, the FID checksum may be used to ensure that the header(s) and the payload stay consistent.)

The suppress filter flag 708 may cause the filter block 426 to be bypassed when the flag is asserted. The suppress filter flag may be used to avoid unnecessary duplication of a filtering operation as the frame passes through multiple switch ASICs. The special frame flag 710 may inhibit error checking. Such inhibition may be desirable to allow transport of frames that are not compliant with the FC standard. The priority flag 714 may be used to expedite the transport of frames in which this flag is asserted.

The EGID field 716 identifies the port through which a frame will exit a switch. This may be different than the outgoing port from the switch ASIC when the switch ASIC is not the only one in the switch. The external VC field 718 identifies the virtual channel upon which a frame is to be sent as the frame exits the switch. The tag checksum field 720 verifies the integrity of the first seven bytes of the supplementary header. Finally, the version field 722 is indicative of the format of the supplementary header. As new formats are created, the version field may be altered to indicate which format is being employed.

Each of the supplementary header field values may be determined from the routing tables (in router block 424) of the switch ASIC that augments the FC frame with a supplementary header. The routing tables, in turn are populated by the host processor in accordance with a customizable routing algorithm. Optionally, the source tag identifier may be determined by the contents of a register associated with the port that first receives the non-augmented FC frame. In one switch embodiment, all of the fields are populated, even if the frame is not an inter-fabric frame and even if the switch does not have more than one switch ASCI. For example, the destination tag may be set equal to the source tag if the frame is an intra-fabric frame. The egress identifier field may indicate the outgoing port in the absence of a core-edge topology. In an alternative switch embodiment, only the fields that may be used will be populated. Thus, for example, the egress identifier field may be invalid in a switch that doesn't have a core-edge topology.

The frame formats shown in FIGS. 5-7 represent digital data that may be modulated on electrical and/or optical carrier signals in accordance with the FC standard. Other carrier signals may also transport the described frame formats. The frames may also be expressed in whole or in part in digital memories of the switch ASIC(s) or the memory of the host processor(s).

Figure 8:
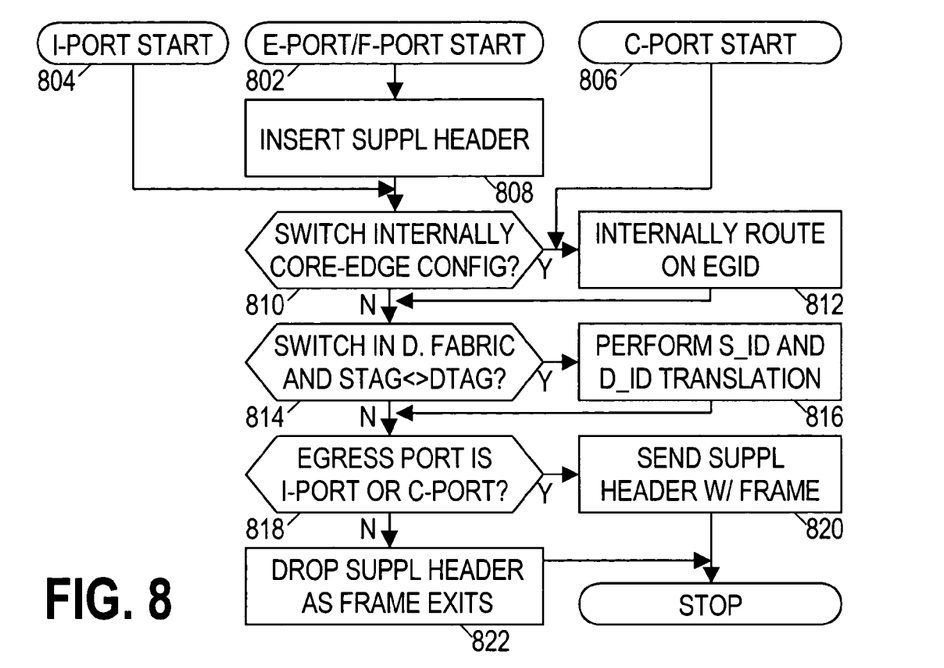
FIG. 8 is an illustrative flowchart of operations on a received FC frame.

FIG. 8 shows an illustrative flowchart of operations on a frame received by a switch. The operations experience by a frame depend on whether the frame is received via an E-Port or an F-Port (block 802); via an I-Port (block 804); or via a C-Port (block 806). For frames received via an E-Port or an F-Port, a supplemental frame header is inserted and populated with appropriate values (block 808). A branch occurs in block 810, based on whether the frame is traversing a switch that has an internal core-edge topology. If the frame is traversing a core-edge topology, each of the switch ASICs (except perhaps the first) route the frame through the switch based on the egress port identifier field of the supplementary header (block 812).

From both blocks 810 and 812, the flow diagram leads to block 814, where another branch occurs based on whether the switch is part of the destination fabric of the frame and the frame is an augmented frame. If the frame is an augmented frame that has reached the target fabric, the switch translates the source identifier and destination identifier in block 816. The source tag may also be updated to reflect the fact that the frame now appears to have originated from within the target fabric.

From both blocks 814 and 816, the flow diagram leads to block 818, where yet another branch occurs based on whether the port through which the frame will leave the switch is an I-Port. If the egress port is an I-Port, the switch sends the FC frame augmented with a supplementary header (block 820). Otherwise, in block 822, the switch drops the supplementary header and sends an FC-compliant frame.

Note that because the disclosed supplementary headers augment an existing multi-fabric FC protocol (e.g., a protocol that allows aliasing and translation of source and destination identifiers), the supplementary headers in many circumstances can be dropped without adverse affect. The routing algorithm may be designed to ensure that the supplementary headers will not be dropped when an untranslated FC frame is traversing a fabric in which the destination identifier alias would not be recognized. In such a circumstance, an extra translation may be performed, or the routing may be designed so that the supplementary header is retained until the target fabric is reached.

To simplify the foregoing description, a distinction has been made between switches and switch ASICs, the internal components of switches. However, this distinction is artificial, as all the components of a switch may be implemented on a single ASIC, or conversely, full blown switches may be used as the internal components of a larger switch. The appended claims may employ the term "switching circuit" to extend coverage to both whole switches and their isolated internal components.

Numerous variations and modifications will become apparent to those skilled in the art once the above disclosure is fully appreciated. It is intended that the following claims be interpreted to embrace all such variations and modifications.

What is claimed is:

1. A switching circuit that comprises:
a port module having two or more ports;
a data storage module configured to receive augmented FC frames from the port module; and
a control module configured to determine outgoing ports for augmented FC frames entering the data storage module,
wherein the data storage module forwards augmented FC frames to corresponding outgoing ports in the port module as determined by the control module; and
wherein each augmented FC frame includes a supplementary header having an egress port identifier field for identifying a port through which the frame will exit a switch.

2. The switching circuit of claim 1, wherein each augmented FC frame includes a supplementary header having a destination tag field for indicating a target fabric.

3. The switching circuit of claim 2, wherein the control module is configured to determine routing information for the augmented FC frames in multiple ways.

4. The switching circuit of claim 3, wherein a first of the multiple ways is a determination based on the destination tag field, wherein a second of the multiple ways is a determination based on a source identifier and a destination identifier, and wherein the routing information determined from the second of the multiple ways includes a value for the destination tag field.

5. The switching circuit of claim 4, wherein the control module employs the first way of determining routing information only if the augmented FC frame is received via a port module port that is configured to receive augmented FC frames, and wherein the control module employs the second way of determining routing information if the augmented FC frame is received via a port module port that is configured to receive non-augmented FC frames.

6. The switching circuit of claim 1, wherein the control module is configured to determine routing information for the augmented FC frames in multiple ways.

7. The switching circuit of claim 6, wherein a first of the multiple ways is a determination based on the egress port identifier field, wherein a second of the multiple ways is a determination based on a source identifier and a destination identifier, and wherein the routing information determined from the second of the multiple ways includes a value for the egress port identifier field.

8. The switching circuit of claim 7, wherein the control module employs the first way of determining routing information only if the augmented FC frame is received via a port module port that is configured to receive augmented FC frames, and wherein the control module employs the second way of determining routing information if the augmented FC frame is received via a port module port that is configured to receive non-augmented FC frames.

9. The switching circuit of claim 1, further comprising outgoing ports configured to receive non-augmented FC frames and configured to drop supplementary headers from augmented FC frames while transmitting.

10. The switching circuit of claim 1, wherein the control module is configured to perform filtering operations on augmented FC frames entering the data storage module, and wherein the control module is further configured to bypass the filtering operations for augmented FC frames having an asserted suppress filter flag.

11. A network that comprises:
a first switching circuit having two or more ports, at least one of which is configured to transmit and receive augmented FC frames;
a second switching circuit having two or more ports, at least one of which is configured to transmit and receive augmented FC frames; and
a communications path to transport augmented FC frames between said at least one port of the first and second switching circuit, wherein the augmented FC frames transported from the first switching circuit to the second switching circuit each include a supplementary header having routing information determined by the first switching circuit, wherein the second switching circuit routes the augmented FC frame based on the routing information in the supplementary header; and wherein the supplementary header includes an egress port identify an outgoing port of the second switching circuit.

12. The network of claim 11, wherein the communications path is a single link.

13. The network of claim 11, wherein the communications path includes multiple links and at least one intermediate switching circuit.

14. The network of claim 11, wherein the supplementary header includes a destination tag to identify a target fabric.

15. The network of claim 11, wherein the supplementary header includes a filter suppression flag, and wherein the second switching circuit suppresses any filtering operations when the filter suppression flag is asserted.

16. The network of claim 11, wherein the supplementary header includes a field to specify a virtual channel, and wherein the second switching circuit associates the augmented FC frame with the specified virtual channel as the frame exits the second switching circuit.

17. The network of claim 11, wherein at least one port of the first switching circuit is associated with a first fabric, and wherein at least one port of the second switching circuit is associated with a second, different fabric.

18. The network of claim 17, wherein the first and second fabrics have a common destination identifier that is associated with different end nodes in the first and second fabrics.

19. A frame routing method in a system that includes at least two switching circuits, where the method comprises:
receiving a FC frame at a first switching circuit;
using a destination identifier from the FC frame to determine routing information associated with the FC frame;
augmenting the FC frame with a supplementary header that includes at least some of the routing information;
sending the augmented FC frame to the second switching circuit; and
routing the augmented FC frame at the second switching circuit in accordance with the routing information in the supplementary header;
wherein the routing information in the supplementary header includes an egress port identifier that identifies a switch port through which the augmented FC frame or an FC standard-compliant counterpart is to exit the second switching circuit.

20. The method of claim 19, wherein said augmenting includes placing the supplementary header between a start-of-frame field in the FC frame and a frame header field in the FC frame.

21. The method of claim 19, wherein the routing information in the supplementary header includes a destination tag that identifies a target fabric to which the augmented FC frame is directed.

22. The method of claim 19, wherein the supplementary header includes a source tag that identifies an originating fabric of the augmented FC frame.

23. The method of claim 19, wherein the supplementary header includes a filter suppression flag that inhibits filtering operations by the second switching circuit.

24. The method of claim 19, wherein the supplementary header includes a special frame flag that inhibits error checking by the second switching circuit.

25. The method of claim 19, wherein the supplementary header includes a priority flag that indicates whether the second switching circuit should expedite retransmission of the augmented FC frame.

26. The method of claim 19, wherein the routing information in the supplementary header includes a virtual channel field that identifies a virtual channel by which the augmented FC frame or an FC standard compliant counterpart is to exit a switch.

27. The method of claim 19, wherein the supplementary header field includes a version field that indicates a format of the supplementary header field.

* * * * *